United States Patent
Lu

(10) Patent No.: US 7,684,702 B2
(45) Date of Patent: Mar. 23, 2010

(54) OPTICAL LINK MONITORING SYSTEM AND METHOD FOR PASSIVE OPTICAL NETWORK

(75) Inventor: Tien-Hsiang Lu, Taipei (TW)

(73) Assignee: Inventec Multimedia & Telecom Corporation, Taipei (TW)

( * ) Notice: Subject to any disclaimer, the term of this patent is extended or adjusted under 35 U.S.C. 154(b) by 473 days.

(21) Appl. No.: 11/802,204

(22) Filed: May 21, 2007

(65) Prior Publication Data
US 2008/0292314 A1 Nov. 27, 2008

(51) Int. Cl.
*H04J 14/00* (2006.01)
*H04B 10/08* (2006.01)

(52) U.S. Cl. .................. 398/67; 398/68; 398/72; 398/33

(58) Field of Classification Search ............... 398/9, 398/14–17, 25, 33, 58, 63, 66, 68, 70–72
See application file for complete search history.

(56) References Cited

U.S. PATENT DOCUMENTS 5,815,295 A * 9/1998 Darcie et al. ............... 398/72
6,108,112 A * 8/2000 Touma ....................... 398/10

* cited by examiner

*Primary Examiner*—Dalzid Singh
(74) *Attorney, Agent, or Firm*—Stout, Uxa, Buyan & Mullins, LLP

(57) ABSTRACT

The present invention provides an optical link monitoring system for the passive optical network. The system includes a master monitoring device connected to an optical line terminal and a plurality of response devices respectively connected to a plurality of optical network units. Through time division multiplexing technology, the master monitoring device broadcasts a predetermined instruction to the response devices to answer back predetermined optical signals in turn. The master monitoring device also measures the optical power of the returned predetermined optical signals and diagnoses the status of the optical links. The present invention also provides an optical link monitoring method.

21 Claims, 4 Drawing Sheets

OPTICAL LINK MONITORING SYSTEM AND METHOD FOR PASSIVE OPTICAL NETWORK

BACKGROUND OF THE INVENTION

1. Field of the Invention

The present invention is related to the monitoring technology for Passive Optical Network (PON), especially to a method for monitoring the status of optical links through the TDM (Time Division Multiplexing) technology to get the responses sequentially from the Optical Network Units (ONU).

2. Description of the Prior Art

With the features of big capacity, high reliability and long transmission distance, the optical fiber becomes the backbone of the telephony communication links. The service transmitting the data to clients directly by the optical fiber will be more widespread. Typical services include, for example, fiber to the cabinet (FTTCab), Fiber To The Curb (FTTC), Fiber To The Building (FTTB) and Fiber To The Home (FTTH) which are services generally referred to as FTTx. Based on the structure with no power sources, Passive Optical Network (PON) has the great chance to prevail over other optical linking technology. FIG. 1 shows the structure of a traditional passive optical network 100, in which the Optical Line Terminal (OLT) 110 connects to the major optical link of the optical network 100, and the light downstream optical signals originated from the OLT 100 are broadcasted to the terminal clients, i.e., the Optical Network Units (ONUs) 131-134 through the passive Splitter (SP) 120. The upstream signals from ONUs 131-134 are coupled by the SP 120 and sent to the OLT 110.

With more and more application of optical network, the fault diagnosis becomes important. FIG. 2 shows an optical network 100 with a broken link. Suppose the optical link lying between the SP 120 and the ONU 134 is broken, the service people, however, are generally unable to determine immediately that the fault point is between the OLT 110 and the SP 120 or between the SP 120 and the ONU 134. Besides, the transmission quality might get deteriorated because the optical cable is affected by the environment, such as compressed or impacted under construction, or bent by gravity. Such deterioration process is usually too slow to become aware instantly and will cause loss of business reputation if it is not dealt with properly. Conventionally, an optical link fault detection apparatus, such as the optical time-domain reflectometry (OTDR), may be used to locate the faulty point. The OTDR locates a faulty point or a broken point by comparing the reflecting optical signal pattern with a typical normal reflecting optical pattern previously recorded. With the tree-structure passive network as shown in FIG. 1 and FIG. 2, it is difficult for the OTDR to determine the status thereof, since it is hard to distinguish the faults lying in the branches of the tree.

In view of the foregoing, there is a need to provide an improved optical link monitoring method and system for the optical network to overcome the shortcoming of the prior art, like the OTDR. It can monitor and record the transmission quality of the optical network to replace the deteriorated optical link in time, and locate the fault immediately to shorten the recovering time.

SUMMARY OF THE INVENTION

It is an object of the present invention to provide an optical link monitoring method for passive optical network to locate the fault position immediately to shorten the recovering time.

It is another object of the present invention to provide an optical link monitoring method for passive optical network to monitor and record the transmission quality of the optical links as well as to replace the deteriorated cable in time.

It is a further object of the present invention to provide an apparatus to implement foregoing monitoring method for passive optical network.

Based on the above objects, the present invention provides an optical link monitoring system which includes a master monitoring device and a plurality of response devices, in which the master monitoring device broadcasts a predetermined command to the response devices so as to request a predetermined response device among the plurality of response devices to continuously answer back a predetermined response optical signal for a first predetermined duration, and the master monitoring device determines whether a predetermined optical link connecting to the predetermined response device is normal or not according to a receiving status of the predetermined response optical signal.

The present invention also provides an optical link monitoring method including following steps: broadcasting a predetermined command from a master monitoring device to a plurality of response devices to command a predetermined response device among the plurality of response devices to continuously answer back a predetermined response optical signal over a first predetermined duration; transmitting the predetermined response optical signal from the predetermined response device to the master monitoring device; and determining whether a predetermined optical link connecting to the predetermined response device is normal or not according to a receiving status of the predetermined response optical signal.

DETAILED DESCRIPTION OF THE INVENTION

Some embodiments of the invention will now be described in greater detail. Nevertheless, it should be noted that the present invention can be practiced in a wide range of other embodiments besides those explicitly described, and the scope of the present invention is expressly not limited except as specified in the accompanying claims.

Note that, the components of the different elements are not shown to scale. Some dimensions of the related components are exaggerated to provide a more clear description and comprehension of the present invention.

Figure 1:
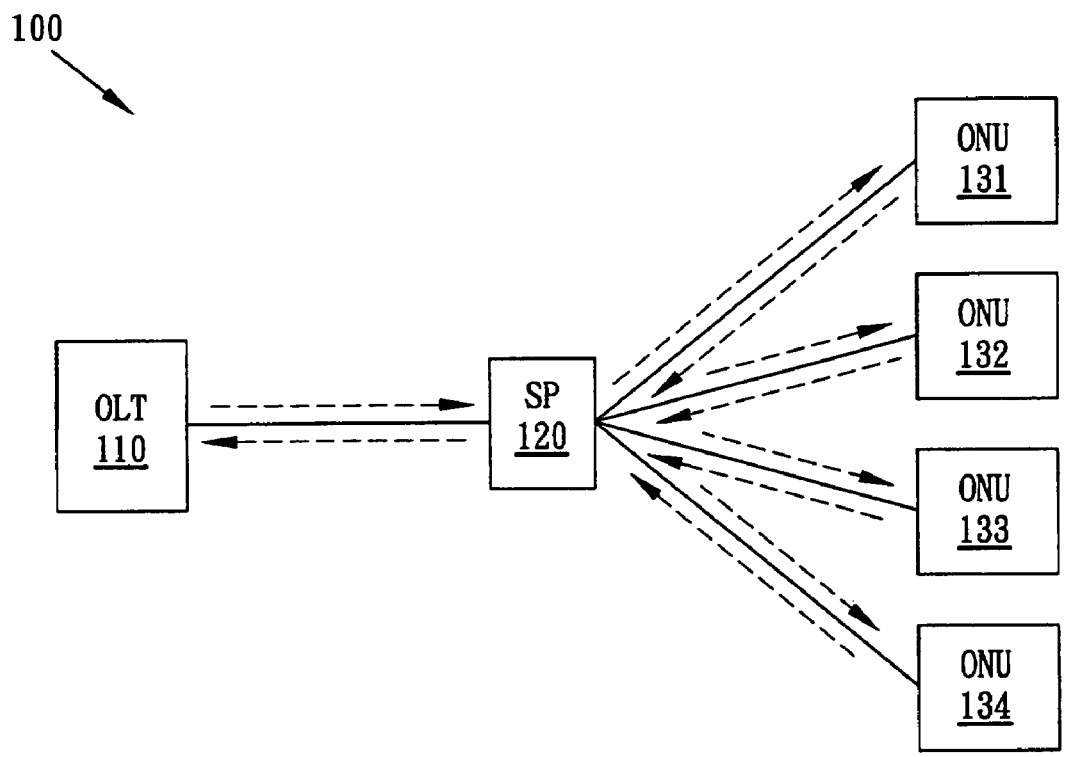
FIG. 1 shows the structure of a traditional passive optical network.
Figure 2:
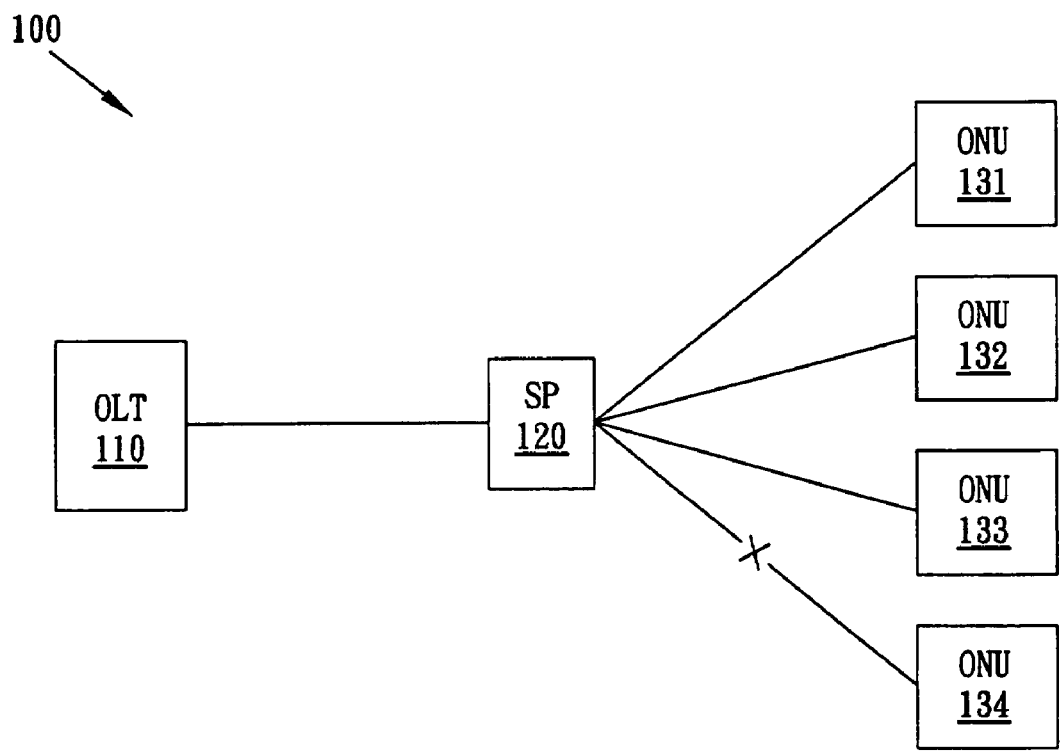
FIG. 2 illustrates a passive optical network with a broken line.
Figure 3:
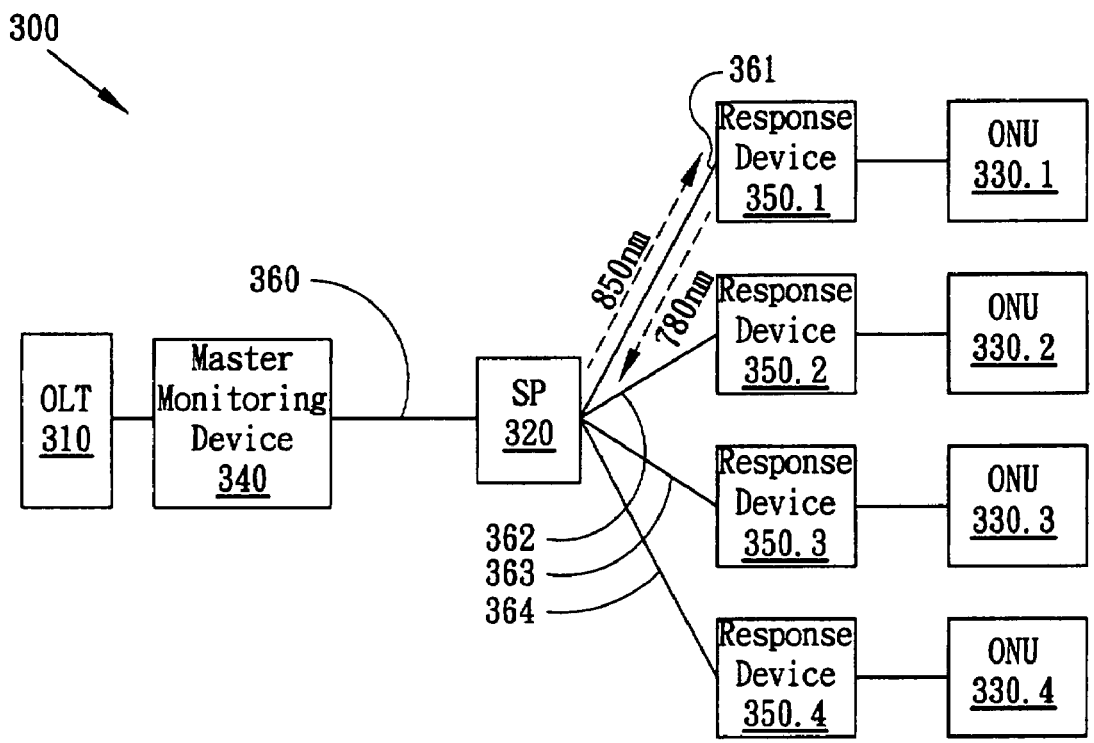
FIG. 3 shows a schematic diagram of the passive optical network system according to an embodiment of the present invention.

FIG. 3 shows a schematic diagram of the passive optical network system 300 with the optical link monitoring capability according to an embodiment of the present invention, including an optical line terminal 310, a master monitoring device 340, a splitter 320, response devices 350.1-350.4 (which may be hereafter alternatively referred to as response devices 350) and optical network units 330.1-330.4. In contrast with the traditional passive optical network of FIG. 1, the master monitoring device 340 and the response devices 350 are the principal components added to execute the monitoring function of the present invention. The optical line terminal 310 connects to the master monitoring device 340 which connects to the splitter 320 through the major optical link 360. The splitter 320 connects to the response devices 350.1-350.4 through optical links 361-364. The response devices 350.1-350.4 connect to the optical network units 330.1-330.4 respectively.

In the present embodiment, the master monitoring device 340 broadcasts an optical signal of 850 nm wavelength in a TDM manner to command each of the response devices 350.1-350.4 to continuously answer back a predetermined response optical signal over a predetermined duration, for example 2 seconds. The splitter 320 splits the broadcast optical signal and delivers them to each response device 350.1-350.4. Note that the exemplified wavelength 850 nm does not intend to be a limit and that the broadcast optical signal may be an optical signal of any wavelength other than those used in normal communication. The duration is not limit to 2 seconds, either. It may be any time period sufficient for the response optical power to be measured. After receiving the broadcast signal, the response devices 350.1-350.4 may respond by sending back an optical signal of 780 nm wavelength to the master monitoring device 340. This returned wavelength is also for example only, and may be any wavelength other than those used in normal communication. After receiving the returned signal, the master monitoring device 340 may analyze and record the optical power thereof, as well as determine whether the optical links 330.1-330.4 connected to the response devices 350.1-350.4 are normal or not. For instance, if the returned optical signal is not received, the power of the returned optical signal is too low (e.g., lower than a predetermined threshold value) or too high (e.g., higher than a predetermined threshold value), then it may conclude that there is something wrong with the optical links 330.1-330.4 connected to the response devices 350.1-350.4. Besides, based on the status of all returned optical signals, it would help to determine whether a fault location is located in the major optical link 360 lying between the master monitoring device 340 and the splitter 320 or not.

Figure 4:
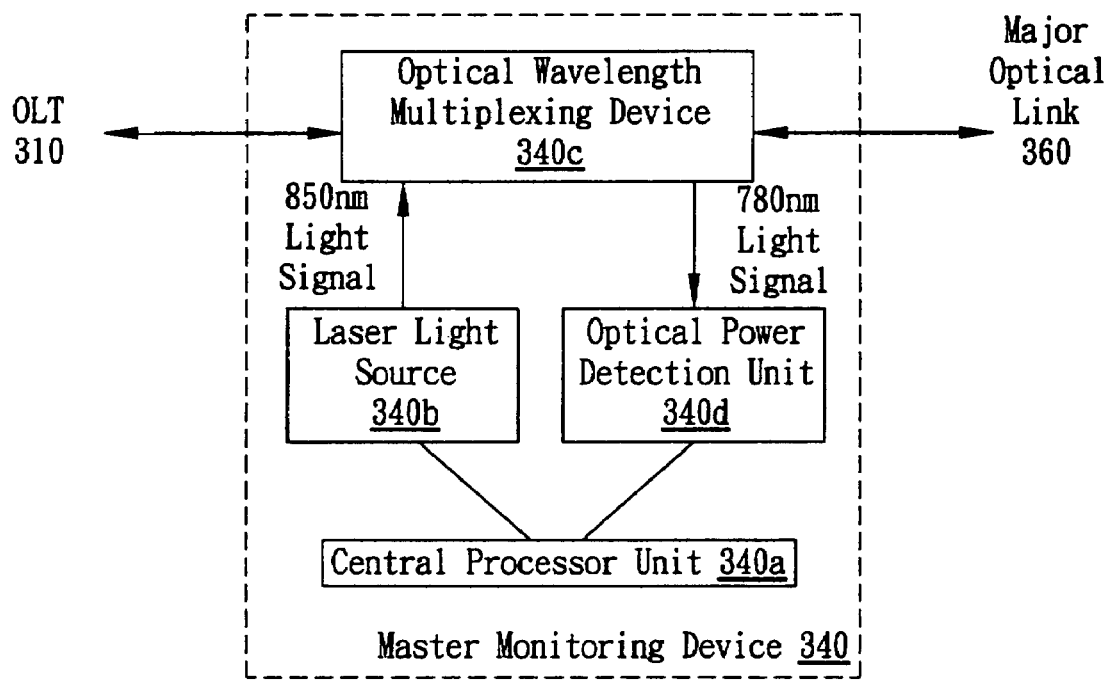
FIG. 4 illustrates a block diagram of the master monitoring device according to an embodiment of the present invention.

FIG. 4 illustrates a block diagram of the master monitoring device 340 according to an embodiment of the present invention, the master monitoring device 340 including an optical wavelength multiplexing device 340c, an optical power detection unit 340d, a central processor unit 340a and a laser light source 340b. The optical wavelength multiplexing device 340c connects to the optical line terminal 310 (not shown in FIG. 4) and the major optical link 360 (not shown in FIG. 4). The optical wavelength multiplexing device 340c further connects to the laser light source 340b and the optical power detection unit 340d. The laser light source 340b and the optical power detection unit 340d both connect to the central processor unit 340a.

The central processor unit 340a controls the laser light source 340b to transmit an optical signal of 850 nm wavelength carrying a predetermined instruction to request a predetermined response device (for example, the response device 350.1) to answer back an optical signal. The 850 nm optical signal is broadcast through the optical wavelength multiplexing device 340c and the optical link connected therewith. Before being broadcast through the connecting optical link, the 850 nm optical signal is multiplexed with the downstream communication optical signal coming from the optical line terminal 310 by the optical wavelength multiplexing device 340c. When receiving the returned optical signal of 780 nm wavelength from the predetermined response device, it may be sent to the optical power detection unit 340d through the optical wavelength multiplexing device 340c. The optical signal received by the optical wavelength multiplexing device 340c may be a multiplexed version containing the returned 780 nm optical signal (from the predetermined response device) and the upstream communication optical signal (from an optical network unit). The returned 780 nm optical signal is demultiplexed or separated from the multiplexed version by the optical wavelength multiplexing device 340c. The central processor unit 340a may then analyze the result from the optical power detection unit 340d in the manner described above. If the result is determined to be normal, the monitoring procedure for next response device will be started; otherwise, the central processor unit 340a will determine that the abnormal situation is broken line, link deterioration or others, and then start the corresponding warning or processing procedures. The central processor unit 340a may include memory devices to record historical results of optical power detection to diagnose the deterioration of network. In an embodiment according to the present invention, the optical wavelength multiplexing device 340c is a wavelength division multiplexer (WDM).

Figure 5:
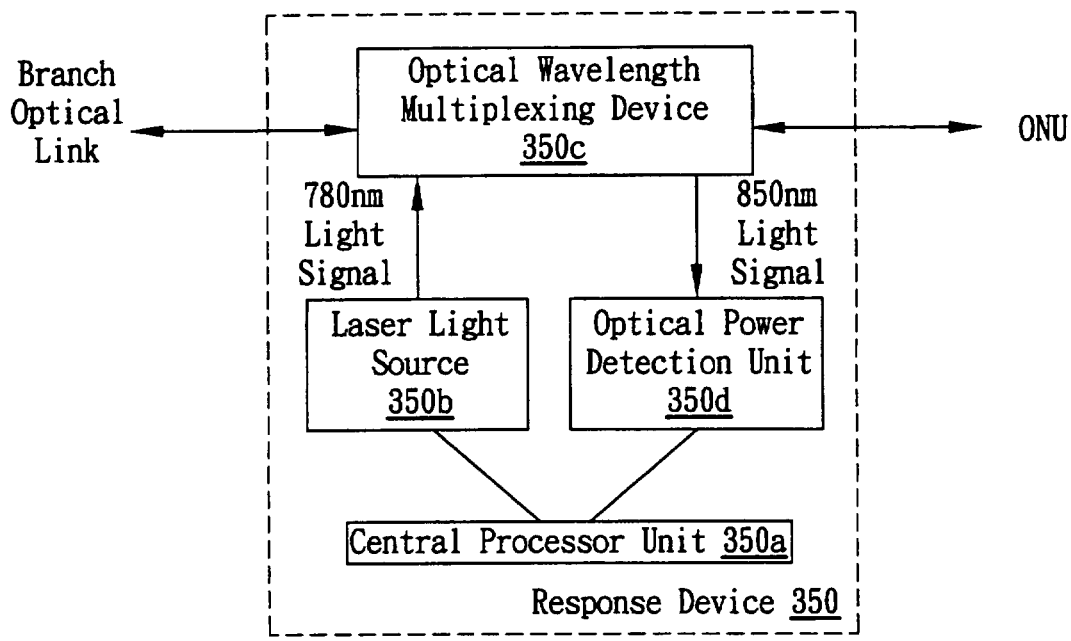
FIG. 5 illustrates a block diagram of the response device according to an embodiment of the present invention.

FIG. 5 illustrates a block diagram of the response device 350 according to an embodiment of the present invention, the response device 350 including an optical wavelength multiplexing device 350c, an optical power detection unit 350d, a central processor unit 350a and a laser light source 350b. The optical wavelength multiplexing device 350c connects to an optical network unit (i.e., an ONU, not shown in FIG. 5) and a branch optical link (not shown in FIG. 5). The optical wavelength multiplexing device 350c further connects to the laser light source 350b and the optical power detection unit 350d. The laser light source 350b and the optical power detection unit 350d both connect to the central processor unit 350a. The optical wavelength multiplexing device 350c receives the multiplexed version of the 850 nm optical signal and the downstream communication optical signal coming from the optical line terminal 310. The optical wavelength multiplexing device 350c then demultiplexes or separates the 850 nm optical signal from the multiplexed version optical signal. The 850 nm optical signal from the master monitoring device is then sent to the optical power detection 350d through the optical wavelength multiplexing device 350c, and analyzed by the central processor unit 350a to get the predetermined instruction. If the destination of the predetermined instruction is the response device 350, the central processor unit 350a will controls the laser light source 350b to continuously transmit an optical signal of 780 nm wavelength back to the master monitoring device through the optical wavelength multiplexing device 350c and the optical link connected therewith. Before being transmitted back, the 780 nm optical signal is multiplexed with the upstream communication optical signal coming from the optical network 330 by the optical wavelength multiplexing device 350c. In an embodiment according to the present invention, the optical wavelength multiplexing device 350c is also a wavelength division multiplexer (WDM).

Figure 6:
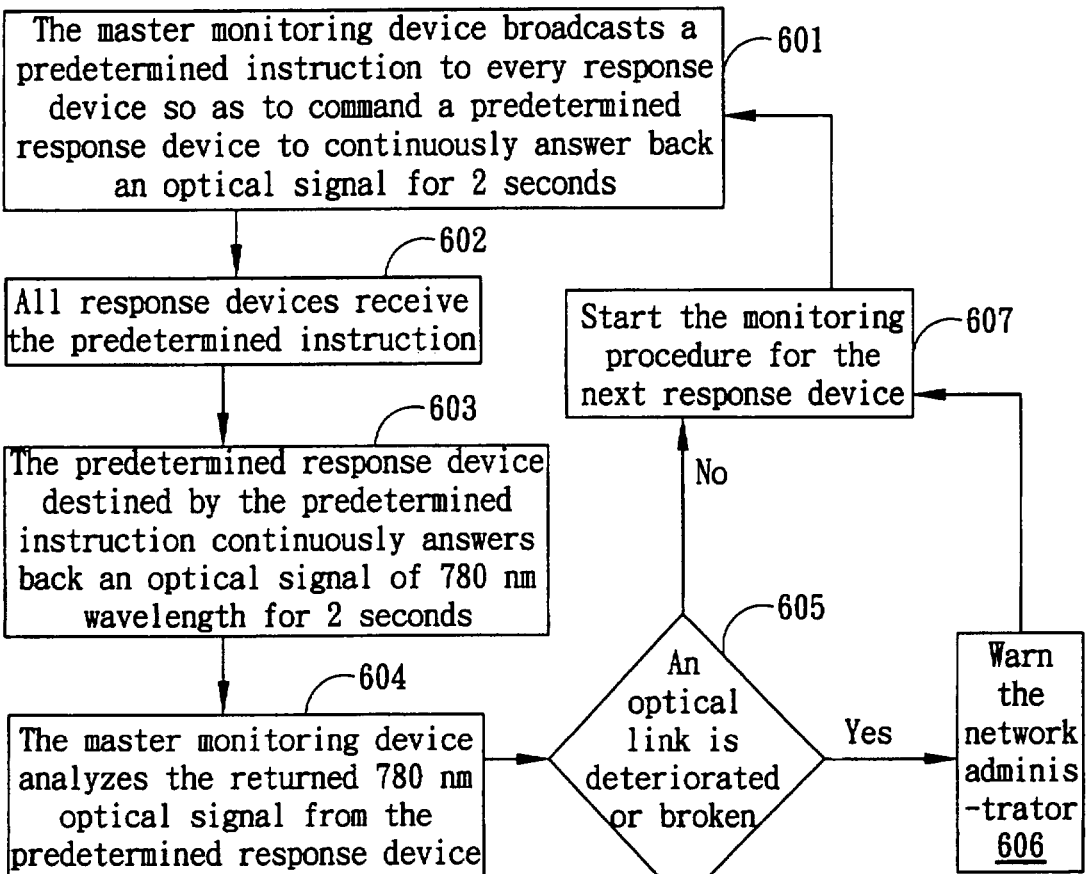
FIG. 6 shows a flow chart of the optical link monitoring method according to an embodiment of the present invention.

FIG. 6 shows a flow chart of the optical link monitoring method according to an embodiment of the present invention, the method including steps 601 through 607. In step 601, the master monitoring device connecting with the optical line terminal broadcasts a predetermined instruction to every response device connecting the optical network unit. In this embodiment, the predetermined instruction is carried over an optical signal of 850 nm wavelength and is configured to command a predetermined response device to continuously answer back an optical signal for 2 seconds. In step 602, all response devices receive the predetermined instruction. In step 603, the predetermined response device destined by the predetermined instruction continuously answers back an optical signal of 780 nm wavelength for 2 seconds. In step 604, during that time period, the master monitoring device analyzes the returned 780 nm optical signal from the predetermined response device, such as determining whether the returned signal is missed or not and the range of associated optical power. In step 605, based on the analyzed outcome, the system may determine whether the optical links are deteriorated or broken. If everything is right, the system will proceed to execute step 607 to start the monitoring procedure for the next response device. If there is something wrong, for example, if the received optical power is lower than some predetermined value, then it may be determined that there is deterioration in some optical link. If there is no optical signal detected, then some optical link may be broken. Under such abnormal situations, the system may start the warning procedure in step 606 to warn the network administrator, for example, by an auditory or visual message through the human interface. At the same time, the system may proceed to step 607 to start the monitoring procedure for the next response device, and locate the fault position based on the returned optical signals from other response devices.

Figure 7:
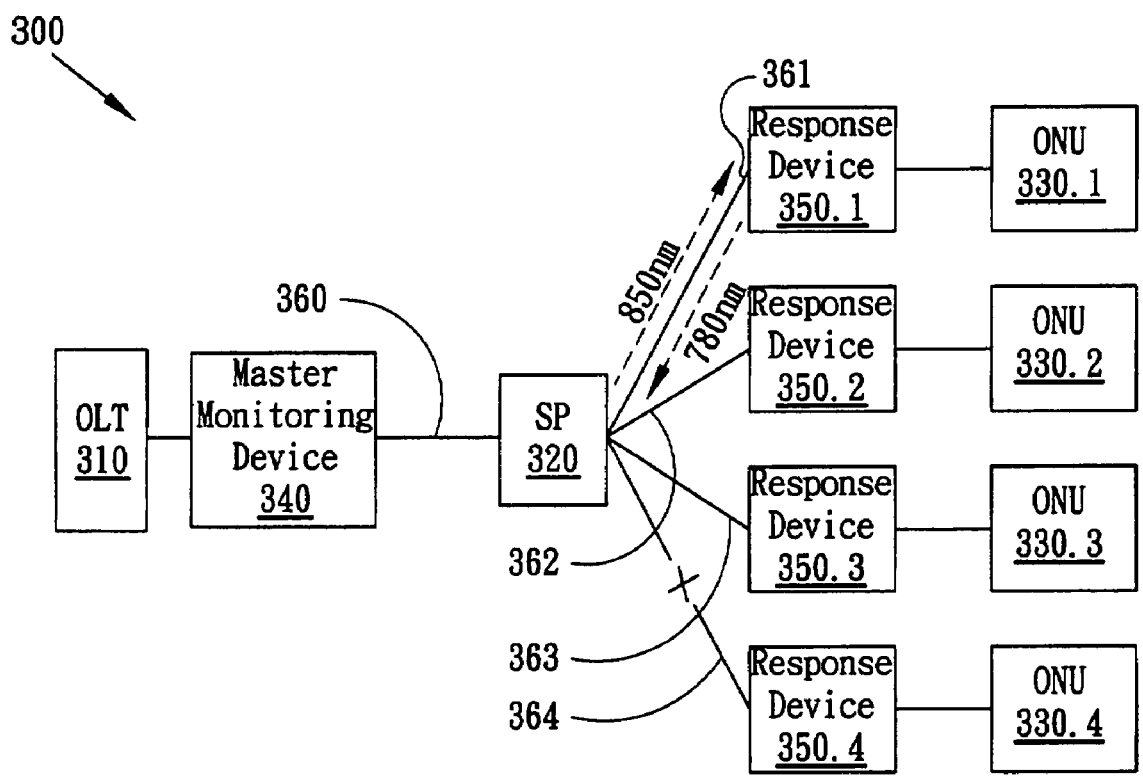
FIG. 7 illustrates the case that a broken line takes place in the passive optical network system shown in FIG. 3.

FIG. 7 illustrates the case that a broken line takes place in the optical network system 300 shown in FIG. 3. The designated numbers 361-364 indicate the optical links between the splitter 320 and the response devices 350.1-350.4. The broken-line situation is in the optical link 364 lying between the splitter 320 and response device 350.4. According to the method of the present invention, the master monitoring device 340 will receive normal returned optical signals from the response devices 350.1-350.3 when executing the monitoring procedures of the response devices 350.1-350.3, which means the optical link between the optical line terminal 310 and the splitter 320 as well as the optical links between the splitter 320 and the response device 350.1-350.3 are alright. The abnormal situation happens during the monitoring procedure for the response device 350.4, which implies that the fault should lie in the optical link between the terminal 310 and the splitter 320, or the optical link between the splitter 320 and the response device 350.4. However, the optical link between the optical line terminal 310 and the splitter 320 should be alright according to the positive outcome of the monitoring procedures for the response devices 350.1-350.3. The fault is then determined to be located in the link between the splitter 320 and the response device 350.4. The overhaul process started by the service people may then be significantly simplified.

The predetermined duration and the predetermined wavelength, such as 850 nm and 780 nm, of optical signals are intended for exemplification only. Those skilled in the art should realize that many other substitute values may achieve the function and characteristics of the present invention. It should be understood, accordingly, that there is no intention to limit the invention to the specific forms disclosed. The invention is to cover all modifications, alternate constructions and equivalents falling within the spirit and scope of the invention as expressed in the appended claims.

What is claimed is:

1. An optical link monitoring system, comprising:
   a plurality of response devices; and
   a master monitoring device, configured to broadcast a predetermined instruction to the plurality of response devices so as to command a predetermined response device among the plurality of response devices to continuously answer back a predetermined response optical signal for a first predetermined duration, the master monitoring device determining whether a predetermined optical link connecting to the predetermined response device is normal or not according to a receiving status of the predetermined response optical signal.

2. The optical link monitoring system as claimed in claim 1, wherein the master monitoring device determines that the predetermined optical link is abnormal if the receiving status of the predetermined response optical signal falls in one of the following cases:
   (1) the master monitoring device fails to receive the predetermined response optical signal in a second predetermined duration;
   (2) an optical power of the predetermined response optical signal received by the master monitoring device in the second predetermined duration is lower than a first threshold value; or
   (3) the optical power of the predetermined response optical signal received by the master monitoring device in the second predetermined duration is higher than a second threshold value.

3. The optical link monitoring system as claimed in claim 1, wherein the master monitoring device connects to an optical line terminal (OLT) and passes downstream and upstream communication optical signals respectively from and to the optical line terminal.

4. The optical link monitoring system as claimed in claim 3, wherein the predetermined response device connects to an optical network unit (ONU) and passes the downstream and upstream communication optical signals respectively to and from the optical network unit.

5. The optical link monitoring system as claimed in claim 4, wherein the predetermined instruction is broadcast to the plurality of response devices through a Time Division Multiplexing (TDM) technology.

6. The optical link monitoring system as claimed in claim 1, wherein the master monitoring device comprises:
   a first laser light source to generate a specific optical signal which carries the predetermined instruction;
   a first optical power detection unit to detect the predetermined response optical signal; and
   a first optical wavelength multiplexing device to interleave the downstream communication optical signal and the specific optical signal into a multiplexed downstream optical signal, and demultiplex a multiplexed upstream optical signal containing the upstream communication optical signal and the predetermined response optical signal.

7. The optical link monitoring system as claimed in claim 6, wherein the predetermined response device comprises:

a second laser light source to generate the predetermined response optical signal;

a second optical power detection unit to detect the specific optical signal which carries the predetermined instruction; and a second optical wavelength multiplexing device to interleave the upstream communication optical signal and the predetermined response optical signal into the multiplexed upstream optical signal, and demultiplex the multiplexed downstream optical signal containing the downstream communication optical signal and the specific optical signal.

8. An optical network system with an optical link monitoring capability, comprising:
   an optical line terminal (OLT) configured to generate a downstream communication optical signal;
   a plurality of optical network units (ONUs) configured to generate upstream communication optical signals;
   a master monitoring device connected to the optical line terminal; and
   a plurality of response devices connected to the plurality of optical network units respectively,
   wherein the master monitoring device broadcasts a predetermined instruction to the plurality of response devices so as to command a predetermined response device among the plurality of response devices to continuously answer back a predetermined response optical signal for a first predetermined duration, and determines whether a predetermined optical link connecting to the predetermined response device is normal or not according to a receiving status of the predetermined response optical signal.

9. The optical network system as claimed in claim 8, wherein the master monitoring device determines that the predetermined optical link is abnormal if the receiving status of the predetermined response optical signal falls in one of the following cases:
   (1) the master monitoring device fails to receive the predetermined response optical signal in a second predetermined duration;
   (2) an optical power of the predetermined response optical signal received by the master monitoring device in the second predetermined duration is lower than a first threshold value; or
   (3) the optical power of the predetermined response optical signal received by the master monitoring device in the second predetermined duration is higher than a second threshold value.

10. The optical network system as claimed in claim 8, wherein the master monitoring device passes the downstream communication optical signals from the optical line terminal.

11. The optical network system as claimed in claim 10, wherein the predetermined response device passes the upstream communication optical signal from the optical network unit.

12. The optical network system as claimed in claim 11, wherein the predetermined instruction is broadcast to the plurality of response devices through a Time Division Multiplexing (TDM) technology.

13. The optical network system as claimed in claim 8, wherein the master monitoring device comprises:
   a first laser light source to generate a specific optical signal which carries the predetermined instruction;
   a first optical power detection unit to detect the predetermined response optical signal; and
   a first optical wavelength multiplexing device to interleave the downstream communication optical signal and the specific optical signal into a multiplexed downstream optical signal, and demultiplex a multiplexed upstream optical signal containing the upstream communication optical signal and the predetermined response optical signal.

14. The optical network system as claimed in claim 13, wherein the predetermined response device comprises:
   a second laser light source to generate the predetermined response optical signal;
   a second optical power detection unit to detect the specific optical signal which carries the predetermined instruction; and
   a second optical wavelength multiplexing device to interleave the upstream communication optical signal and the predetermined response optical signal into the multiplexed upstream optical signal, and demultiplex the multiplexed downstream optical signal containing the downstream communication optical signal and the specific optical signal.

15. An optical link monitoring method comprising:
   broadcasting a predetermined instruction from a master monitoring device to a plurality of response devices to command a predetermined response device among the plurality of response devices to continuously answer back a predetermined response optical signal for a first predetermined duration;
   transmitting the predetermined response optical signal from the predetermined response device to the master monitoring device; and
   determining whether a predetermined optical link connecting to the predetermined response device is normal or not according to a receiving status of the predetermined response optical signal.

16. The method as claimed in claim 15, wherein the master monitoring device determines that the predetermined optical link is abnormal if the receiving status of the predetermined response optical signal falls in one of the following cases:
   (1) the master monitoring device fails to receive the predetermined response optical signal in a second predetermined duration;
   (2) an optical power of the predetermined response optical signal received by the master monitoring device in the second predetermined duration is lower than a first threshold value; or
   (3) the optical power of the predetermined response optical signal received by the master monitoring device in the second predetermined duration is higher than a second threshold value.

17. The method as claimed in claim 15, wherein the master monitoring device connects to an optical line terminal (OLT) and passes downstream and upstream communication optical signals respectively from and to the optical line terminal.

18. The method as claimed in claim 17, wherein the predetermined response device connects to an optical network unit (ONU) and passes the downstream and upstream communication optical signals respectively to and from the optical network unit.

19. The method as claimed in claim 18, wherein the predetermined instruction is broadcast to the plurality of response devices through a Time Division Multiplexing (TDM) technology.

20. The method as claimed in claim 15, wherein the master monitoring device comprises:
   a first laser light source to generate a specific optical signal which carries the predetermined instruction;
   a first optical power detection unit to detect the predetermined response optical signal; and a first optical wavelength multiplexing device to interleave the downstream communication optical signal and the specific optical signal into a multiplexed downstream optical signal, and demultiplex a multiplexed upstream optical signal containing the upstream communication optical signal and the predetermined response optical signal.

21. The method as claimed in claim 20, wherein the predetermined response device comprises:

a second laser light source to generate the predetermined response optical signal;

a second optical power detection unit to detect the specific optical signal which carries the predetermined instruction; and a second optical wavelength multiplexing device to interleave the upstream communication optical signal and the predetermined response optical signal into the multiplexed upstream optical signal, and demultiplex the multiplexed downstream optical signal containing the downstream communication optical signal and the specific optical signal.

* * * * *